United States Patent [19]

Pool

[11] Patent Number: 5,063,705
[45] Date of Patent: * Nov. 12, 1991

[54] FISHING LURE

[76] Inventor: Richard B. Pool, 1343 Summit Rd., Lafayette, Calif. 94549

[*] Notice: The portion of the term of this patent subsequent to Dec. 4, 2007 has been disclaimed.

[21] Appl. No.: 519,656

[22] Filed: May 7, 1990

Related U.S. Application Data

[63] Continuation of Ser. No. 450,357, Dec. 16, 1982, Pat. No. 4,976,061.

[51] Int. Cl.5 ............................................. A01K 83/00
[52] U.S. Cl. ....................................... 43/44.6; 43/44.2
[58] Field of Search ...................... 43/44.6, 44.2, 44.8, 43/44.4, 44.9, 42.09, 42.14

[56] References Cited

U.S. PATENT DOCUMENTS

| 3,197,911 | 8/65 | Rolfsness | 43/44.2 |
| 3,200,532 | 8/65 | Walton | 43/44.6 |
| 3,543,434 | 12/70 | Hauck | 43/44.6 |
| 4,976,061 | 12/90 | Pool | 43/44.2 |

FOREIGN PATENT DOCUMENTS

| 408096 | 4/34 | U.K. | 43/44.2 |
| 1096694 | 6/55 | France | 43/44.2 |

Primary Examiner—Kurt Rowan
Attorney, Agent, or Firm—Bruce & McCoy

[57] ABSTRACT

An improved fishing lure which includes a spacer secured to a fishhook which positions and holds the hook at a predetermined distance and optimum position behind a spinner which holds a baitfish.

3 Claims, 1 Drawing Sheet

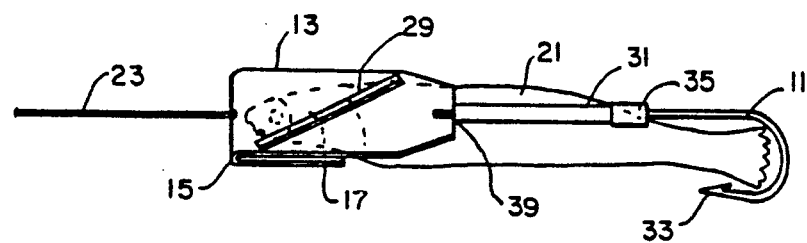
FIG.—1
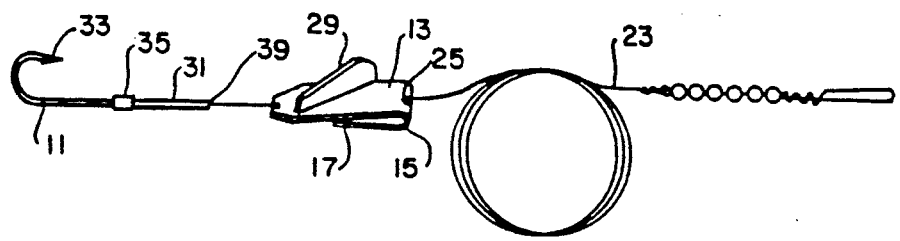
FIG.—2
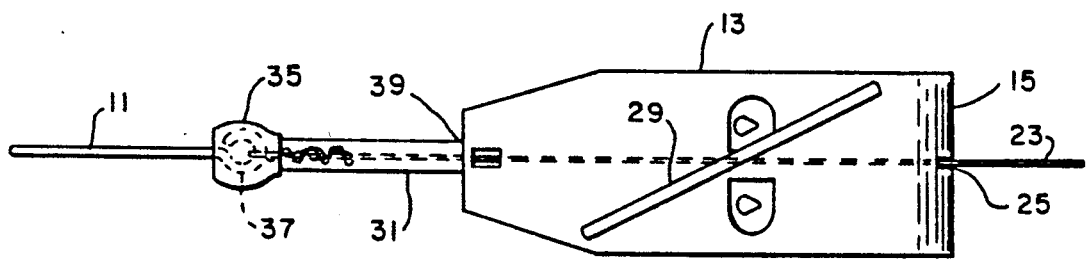
FIG.—3
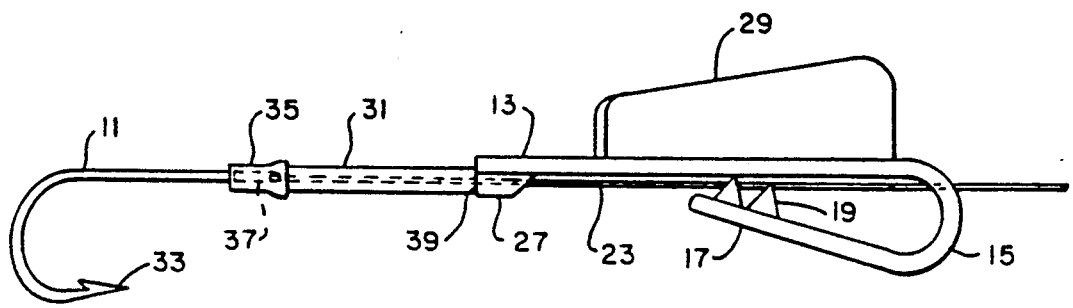
FIG.—4

FISHING LURE

This is a continuation of copending application(s) Ser. No. 06/450,357 filed on Dec. 16, 1982 now U.S. Pat. No. 4,976,061

BACKGROUND OF THE INVENTION

1. Field of the Invention

The present invention relates to fishing lures and more particularly to a combination spacer and fishhook holder for a spinning bait which positions the fishhook at the tail of the baitfish without threading the fishing line or the fishhook through the baitfish.

2. Description of the Prior Art

Spinning baitfish clamps, such as shown in the present invention, are known but have either not had the fishhook placed in the proper position or have required jury rigs, such as toothpicks or other expendable props or supports, to position the hook, and this had numerous disadvantages. First, and most importantly, it tore up the baitfish. Secondly, the hook bounced and twisted away from the baitfish and into positions where a fish would not be hooked by striking the baitfish. A hook dangling in the wrong position also slows down or stops the spinning of the baitfish which is the critical characteristic of the lure. This has been determined to be an important factor in attracting fish since a spinning baitfish appears to be wounded, and fish attack those baitfish first.

Other systems which thread the fishhook through the baitfish do not position the fishhook right at the tail of the baitfish which has been determined by underwater photography and television to be the most desirable position to dispose the tip of the fishhook. Prior to the present invention there has been no way of positioning and holding a fishhook right at the tail of a baitfish or to eliminate the problems of tearing up the baitfish by inserting the fishhook through it.

SUMMARY OF THE INVENTION

The present invention is an improved fishing lure which includes a spinner for rotating the baitfish and a spacer for supporting the fishhook at a predetermined distance from the spinner and in the optimum position to hook a striking fish. The spacer is elongated with one end thereof formed to engage the eye end of the fishhook while surrounding the fishing line which is tied to the eye. The other end of the spacer is formed to bear against the spinner thereby maintaining the fishhook in fixed position with respect to the baitfish rotated by the spinner.

OBJECTS OF THE INVENTION

It is therefore an important object of the present invention to provide a spacer for a fishing lure which will position a fishhook at the tail of a baitfish.

It is another object of the present invention to provide a fishing lure for spinning a baitfish in which neither the fishhook nor the fishing line has to be threaded through, or inserted through the baitfish.

It is a further object of the present invention to provide a spacer for a spinning fish lure which holds the fishhook in a projecting semirigid optimum position at the tail of the baitfish for hooking a fish when it strikes at the baitfish.

And it is still another object of the present invention to provide an improved fishing lure which includes a spinner that grasps and holds a baitfish and spins it while providing a spacer that bears against said spinner and positions a fishhook with respect to the baitfish and maintains the fishhook at the tail of the baitfish while it spins.

Other objects of the present invention will become apparent when it is considered in conjunction with the accompanying drawings.

DESCRIPTION OF THE DRAWINGS

FIG. 1 is a perspective view of the combination spinner and spacer showing a baitfish secured in the spinner with the fishhook securely held and disposed at the tail of the baitfish;

FIG. 2 shows the improved fishing lure of the present invention with the leader assembly attached thereto;

FIG. 3 is a top plan view of a preferred embodiment of the present invention; and FIG. 4 is a side elevation of the present invention.

DESCRIPTION OF THE PREFERRED EMBODIMENT

The present invention is an improved fishing lure which disposes a fishhook 11 at the tail of a baitfish. A spinner 13 is provided which is a bent piece of spring plastic which is formed into a clamp 15. The internal face of the clip portion 17 of the clamp has projections 19 which grasp a baitfish 21 when it is inserted into the clamp. This is done by spreading apart the clip portion 17 of the clamp and shoving the head of the baitfish up into the clamp portion of the spinner and then releasing the clamp so that it can grasp the fish with the projections 19.

The spinner is provided with a means which permits the fishing line 23 to pass through the spinner. A channel 25 is formed at the front end of the clamp which permits the fishing line or the leader to pass through the spinner. The pass through means includes a guide 27 at the rear end of the spinner where the leader or fishing line exits the spinner.

An angled plate 29 is secured to the clamp portion of the spinner on the opposite side from the clip 17. The angled plate is disposed in such a manner with respect to the fishing line or leader, which passes through the spinner, that the clamp portion of the spinner rotates around the line or leader and spins in the water due to the action of the water an the angled plate as the line is pulled through the water.

The improved fishing lure includes a spacer 31for supporting the fishhook at a predetermined distance from said spinner and holding the fishhook steady in anticipation of a fish strike. The particular distance which is predetermined is that which positions the barbed tip 33 of the hook proximate the tail of the baitfish when the baitfish is clamped in the spinner. The spacer is an elongated tube having one end 35 thereof formed to engage the eye end 37 of the fishhook after the leader or fishing line has been secured to the eye of the fishhook. The tube surrounds the fishing line or leader, which is tied to the fishhook eye, and the other end 39 of the tube or spacer is formed to bear against the spinner with the bearing surface, or bearing end, and permits the spinner to rotate with respect to the spacer and the fishhook if the fishing line has become twisted and will not permit the hook to rotate with the baitfish (an unusual situation).

In the preferred embodiment, the spacer is a polyethylene tube which has been pressed, shrunk onto, or stretched over the eye of the fishhook after the fishing line or leader has been secured to it. The spacer can be of any desired length to accommodate the different length baitfish that can be used with the fishing lure. The tube protects the fishing line or leader from being cut or frayed by the mouth of a hooked fish. After a fish is hooked, the spacer allows flexing of the line at both ends of the tube which significantly reduces the possibility of the fish twisting itself free from the hook.

To utilize the improved fishing lure of the present invention, a spacer of the appropriate length is secured to the fishhook on the fishing line matched to the length of the baitfish. In actual practice, several different length spacers are utilized with different spinners so that one can just select the proper length of spinner and spacer for the baitfish that has been selected for use. The head of the baitfish is then secured under the clamp on the spinner with the tail disposed proximate the barb of the fishhook. The lure is then connected to a fishing line which uses a weight, or a downrigger with a weighted line, or a diving plane to take the lure to the desired depth.

It is obvious in this description of the present invention that the improved fishing lure can achieve the objects attributed thereto. The accurate spacing of the fishhook with respect to the baitfish is determined by the spacer and the hook is held in the optimum extended position. Prior to the present invention, a spinner, such as described herewith, would not work anywhere near as effectively until the fishhook could be disposed with its book near the tail of the baitfish without the book having to be secured by expendable props or threaded through the baitfish or stuck through the body thereof to position it. This improves immeasurably the combined rolling action of the lure and the baitfish into almost a perfect rotation even after the bait has been hit. This improvement has been determined by underwater pictures and has improved immeasurably the fish attracting and catching ability of the lure. The improvement allows the lure to be semirigid so that the hook remains disposed at the most advantageous position with respect to the baitfish for increasing the hookup ability of the lure as compared with previous devices.

I claim:

1. An improved fishing lure comprising a spinner having a clamp for holding the head of a baitfish, means for permitting the fishing line or leader to pass through said spinner including a guide at the rear of the spinner, an angled plate secured to said clamp of said spinner at a position with respect to the means for the fishing line or leader to pass through the spinner which causes the spinner to rotate in the water as the lure is pulled through it, and a pliable, semi-rigid, salt water and temperature variation resistant spacer for supporting a fishhook at a predetermined distance from said spinner with the barb of said fishhook proximate the tail of a baitfish, said spacer being elongated with the rear end being formed to grip the eye end of the fishhook while surrounding the fishing line or leader tied to said fishhook eye such that the fishhook is maintained in the same longitudinal line as said spacer, the front end of said spacer being formed to bear against the spinner at the point where said guide for said fishing line is formed on said spinner, said spacer permitting the entire lure to rotate as a semi-rigid unit.

2. An improved fishing lure having a fishhook attached to a fishing line and using a baitfish of predetermined size comprising a spinner for rotating the baitfish and including clamp means for clamping the head of the baitfish such that the tail extends in substantially the longitudinal direction of the line, Spacer means surrounding the fishing line for spacing the fishhook at a predetermined distance from said clamp means with the barb of the fishhook proximate the tail of the baitfish in the optimum extended position, said spacer means bearing against the eye end of said fishhook at one end and bearing against said spinner at the other end thereof.

3. An improved fishing lure comprising a spinner rotating a baitfish, and a pliable, semi-rigid, saltwater and temperature variation resistant spacer for supporting a fishhook at a predetermined distance from said spinner proximate the tail of said baitfish, said spacer being elongated and with the rear end thereof being formed to grip the eye end of said fishhook while surrounding the fishing line or leader tied to said fishhook eye such that the fishhook is maintained in the same longitudinal line as said spacer, the front end of said spacer being formed to bear against said spinner.

* * * * *